(12) United States Patent
Wu et al.

(10) Patent No.: US 9,906,043 B2
(45) Date of Patent: Feb. 27, 2018

(54) POWER SUPPLY AND ELECTRONIC DEVICE USING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Kang Wu, Shenzhen (CN); Guo-Yi Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 399 days.

(21) Appl. No.: 14/750,701

(22) Filed: Jun. 25, 2015

(65) Prior Publication Data
US 2016/0329723 A1 Nov. 10, 2016

(30) Foreign Application Priority Data
May 8, 2015 (CN) .......................... 2015 1 0231548

(51) Int. Cl.
*H02J 5/00* (2016.01)
*H02J 4/00* (2006.01)
*H02J 1/08* (2006.01)

(52) U.S. Cl.
CPC .................. *H02J 5/00* (2013.01); *H02J 4/00* (2013.01); *H02J 1/08* (2013.01)

(58) Field of Classification Search
CPC ........................................................ H02J 5/00
USPC ........................................................... 307/31
See application file for complete search history.

(56) References Cited

U.S. PATENT DOCUMENTS

| | | | | |
|---|---|---|---|---|
| 2004/0150267 | A1* | 8/2004 | Ferguson | G06F 1/266 307/70 |
| 2008/0012426 | A1* | 1/2008 | Lu | H02J 9/062 307/65 |
| 2012/0030483 | A1* | 2/2012 | Kung | G06F 1/26 713/300 |
| 2012/0293014 | A1* | 11/2012 | Wang | G01R 31/2801 307/116 |
| 2013/0275777 | A1* | 10/2013 | Shih | G06F 1/30 713/300 |

* cited by examiner

*Primary Examiner* — Joseph Chang
(74) *Attorney, Agent, or Firm* — ScienBiziP, P.C.

(57) ABSTRACT

The disclosure provides a power supply device including an input connector, a direct current (DC) processing unit, and an alternating current (AC) processing unit. The input connector obtains an AC power from an AC power supply and transmits the AC power to the DC processing unit and AC processing unit. The DC processing unit converts the AC power to a DC power, and converts the DC power to a plurality of DC voltages. The AC processing unit converts the AC power provided by the power supply to a plurality of AC voltages. An electronic device including the power supply device is also provided.

7 Claims, 2 Drawing Sheets

POWER SUPPLY AND ELECTRONIC DEVICE USING THE SAME

FIELD

The subject matter herein generally relates to electronic devices and particularly to an electronic device with a power supply.

BACKGROUND

Generally, each electric appliance needs a power supply unit to supply operation voltages.

BRIEF DESCRIPTION OF THE DRAWINGS

Implementations of the present technology will now be described, by way of example only, with reference to the attached figures.

DETAILED DESCRIPTION

Figure 1:
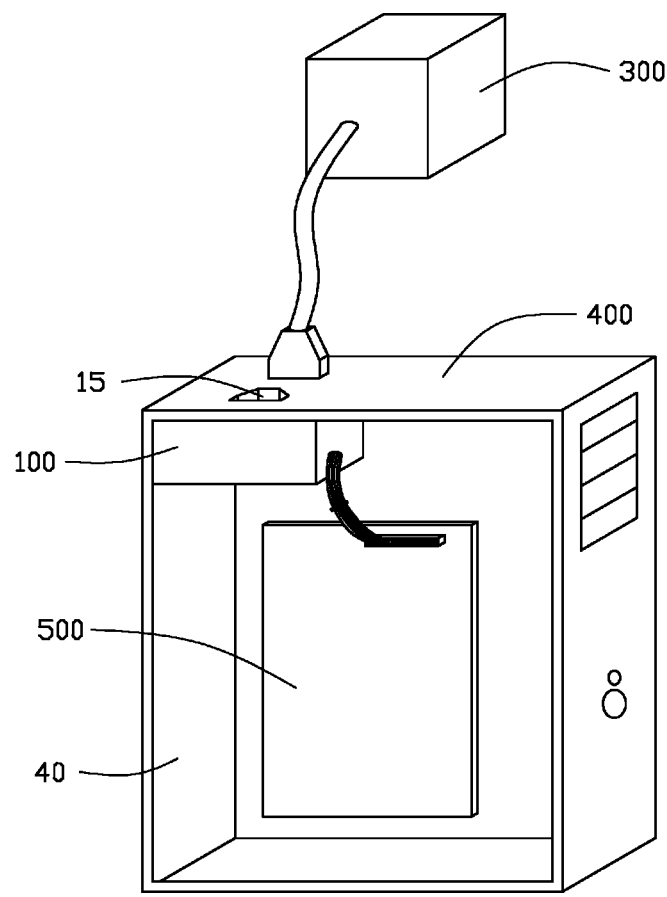
FIG. 1 is a diagrammatic view of an embodiment of an electronic device, the electronic device comprising a power supply device electrically coupled to an electric appliance.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an electronic device 400 of the present disclosure. The electronic device 400 in accordance with an exemplary embodiment can comprise a power supply device 100, a housing 40, and a motherboard 500. The electronic device 400 can comprise a plurality of output connectors 15 electrically coupled to the power supply device 100 and mounted on an outer surface of the housing 40. The power supply device 100 can be mounted in the housing 40. The power supply device 100 can power the motherboard 500 and power an electronic appliance 300 through an output connector 15.

Figure 2:
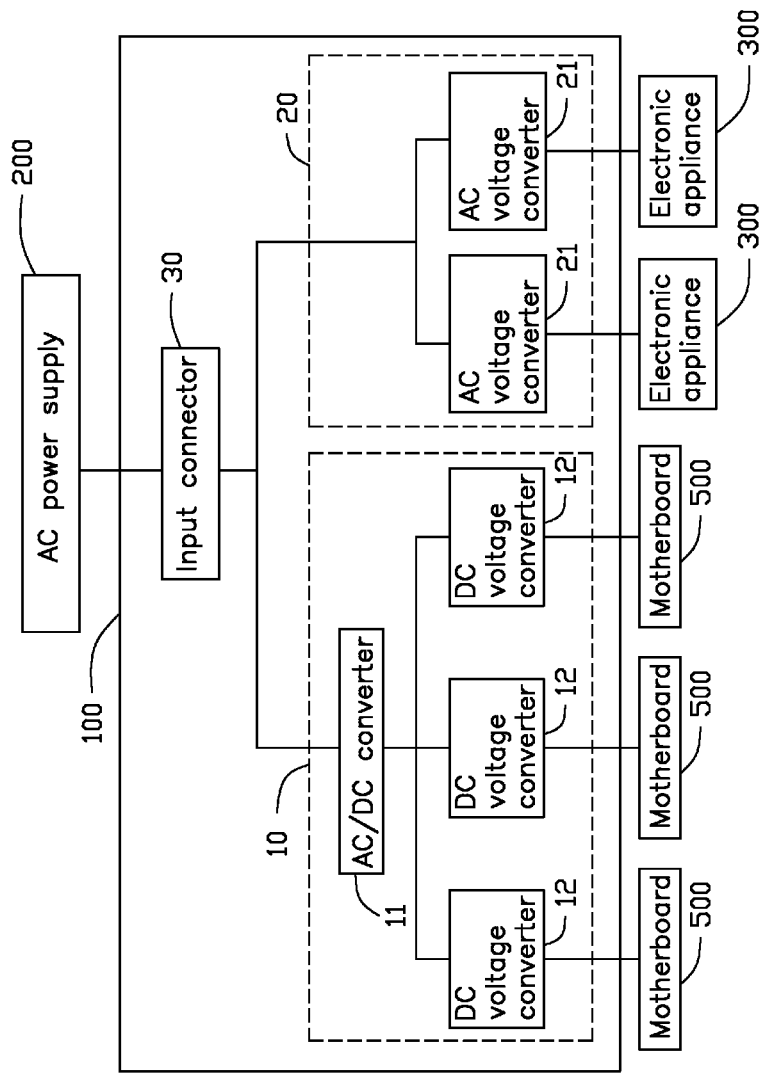
FIG. 2 is a block diagram of an example embodiment of the power supply device of FIG. 1.

FIG. 2 illustrates an embodiment of the power supply device 100. The power supply device 100 can comprise a direct current (DC) processing unit 10, an alternating current (AC) processing unit 20, and an input connector 30. The DC processing unit 10 can comprise an AC/DC converter 11 and a plurality of direct voltage converters 12. The AC processing unit 20 can comprise a plurality of alternating voltage converters 21. The AC/DC converter 11 is electrically coupled to the input connector 30. The DC voltage converters 12 are all electrically coupled to the AC/DC converter 11. The AC voltage converters 21 are all electrically coupled to the input connector 30. The input connector 30 is electrically coupled to an AC power supply 200. In at least one embodiment, the AC power supply 200 may be a household power supply or a commercial power supply.

The AC/DC converter 11 can obtain AC power from the AC power supply 200 through the input connector 30, convert the AC power into a DC power, and transmit the DC power to each of the direct voltage converters 12. Each of the DC voltage converters 12 can convert the DC power provided by the AC/DC converter 11 into a DC voltage.

Each of the AC voltage converters 21 can obtain the AC power from the AC power supply 200 through the input connector 30 and convert the AC power into an AC voltage.

In use, the AC/DC converter 11 is thereby electrically coupled to the AC power supply 200 via the input connector 30. Thus, the AC/DC converter 11 obtains the AC power from the AC power supply 200, converts the AC power into the DC power, and transmits the DC power to each of the DC voltage converters 12. Each of the DC voltage converters 12 can convert the DC power provided by the AC/DC converter 11 into a DC voltage, and output the DC voltage to motherboard 500. In the meantime, each of the AC voltage converters 21 obtains the AC power from the AC power supply 200 through the input connector 30, converts the AC power into an AC voltage, and outputs the AC voltage to electronic appliances 300 through the output connector 15 of the housing 40.

As detailed above, the power supply device 100 can convert the AC power provided by the AC power supply 200 into a plurality of DC voltages, and output the DC voltages to the motherboard 500. The power supply device 100 can convert the AC power provided by the AC power supply 200 into a plurality of AC voltages, and output the AC voltages to a plurality of electronic appliances 300.

The embodiments shown and described above are only examples. Many details are often found in the art such as the other features of the power supply. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power supply device comprising:
   an input connector configured for electrically coupling to an alternating current (AC) power supply;
   a direct current (DC) processing unit electrically coupled to the input connector to obtain an AC power from the AC power supply, convert the AC power to a DC power, and convert the DC power to a plurality of DC voltages; and an AC processing unit electrically coupled to the input connector to obtain the AC power from the AC power supply, and convert the AC power to a plurality of AC voltages; wherein the AC processing unit comprises a plurality of AC voltage converters, each of the plurality of AC voltage converters is electrically coupled to the input connector.

2. The power supply device of claim 1, wherein the DC processing unit comprises an AC/DC converter and a plurality of DC voltage converters, the AC/DC converter is electrically coupled to the input connector to receive the AC power from the AC power supply, and converts the AC power to the DC power, each DC voltage converter is electrically coupled to the AC/DC converter to receive the DC power, and converts the DC power to a DC voltage.

3. The power supply device of claim 2, wherein each of the plurality of AC voltage converters receives the AC power from the AC power supply, and converts the AC power to an AC voltage.

4. An electronic device comprising:
   a motherboard; and
   a power supply device comprising:
      an input connector configured for electrically coupling to an alternating current (AC) power supply;
      a direct current (DC) processing unit electrically coupled to the input connector to obtain an AC power from the AC power supply, converting the AC power to a DC power, and converting the DC power to a plurality of DC voltages to power the motherboard;
      an AC processing unit electrically coupled to the input connector to obtain the AC power from the AC power supply, and converting the AC power to a plurality of AC voltages; wherein the AC processing unit comprises a plurality of AC voltage converters, each of the plurality of AC voltage converters is electrically coupled to the input connector; and
      a plurality of output connectors configured for outputting the AC voltages generated by the AC processing unit.

5. The electronic device of claim 4, wherein the DC processing unit comprises an AC/DC converter and a plurality of DC voltage converters, the AC/DC converter is electrically coupled to the input connector to receive the AC power from the AC power supply, and converts the AC power to the DC power, each DC voltage converter is electrically coupled to the AC/DC converter to receive the DC power, and converts the DC power to a DC voltage.

6. The electronic device of claim 5, wherein each of the plurality of AC voltage converters receives the AC power from the AC power supply, and converts the AC power to an AC voltage.

7. A power supply device comprising:
   an input connector configured to electrically couple to an alternating current (AC) power supply;
   a direct current (DC) processing unit, comprising:
      an AC/DC converter electrically connected to the input connector to convert power from the AC power supply into a DC voltage;
      a plurality of DC voltage converters electrically connected to the AC/DC converter; and
   an AC processing unit, comprising a plurality of AC voltage converters electrically connected to the input connector.

* * * * *